(12) United States Patent
Buttigieg

(10) Patent No.: US 6,443,723 B1
(45) Date of Patent: Sep. 3, 2002

(54) SLIDE RETAINER FOR AN INJECTION MOLD

(75) Inventor: Joseph Buttigieg, Farmington Hts., MI (US)

(73) Assignee: D-M-E Company, Madison Heights, MI (US)

( * ) Notice: Subject to any disclaimer, the term of this patent is extended or adjusted under 35 U.S.C. 154(b) by 0 days.

(21) Appl. No.: 09/433,753

(22) Filed: Nov. 4, 1999

(51) Int. Cl.[7] .............................................. B29C 45/64
(52) U.S. Cl. ........................ 425/214; 425/433; 425/577
(58) Field of Search ................................. 425/183, 186, 425/168, 577, 468, 441, 443, 329, 330, 214

(56) References Cited

U.S. PATENT DOCUMENTS

| | | | | |
|---|---|---|---|---|
| 3,811,645 A | * | 5/1974 | Feist | 249/68 |
| 4,515,342 A | * | 5/1985 | Boskovic | 249/122 |
| 4,765,585 A | * | 8/1988 | Wieder | 249/64 |
| 4,768,747 A | * | 9/1988 | Williams et al. | 249/63 |
| 4,886,640 A | * | 12/1989 | Garner, Jr. et al. | 420/111 |
| 5,234,329 A | * | 8/1993 | Vandenberg | 425/186 |
| 5,397,226 A | * | 3/1995 | Vandenberg | 425/192 R |
| 5,407,344 A | * | 4/1995 | Rombalski, Jr. et al. | 425/190 |
| 6,116,891 A | * | 9/2000 | Starkey | 425/556 |

OTHER PUBLICATIONS

Rosato, D. Injection Molding Handbook, 2nd edition, Chapman & Hall, © 1995, pp. 313–320.*
Superior Die Set Corp. product literature (publication date 1994).

* cited by examiner

Primary Examiner—Jan H. Silbaugh
Assistant Examiner—Emmanuel Luk
(74) Attorney, Agent, or Firm—Stephen H. Friskney

(57) ABSTRACT

A cam slide retainer for injection molds includes a hardened wear plate with an elongated latch groove, mounted in a corresponding recess formed in the lower surface of the cam slide. The wear plate is aligned in the direction of travel of the cam slide and has a length that is no less than the length of stroke of the slide. A conventional spring-loaded plunger mounted adjacent the wear plate remains in contact with the wear plate throughout the stroke of the slide, so that the slide itself is not subject to wear from contact with the plunger.

5 Claims, 2 Drawing Sheets

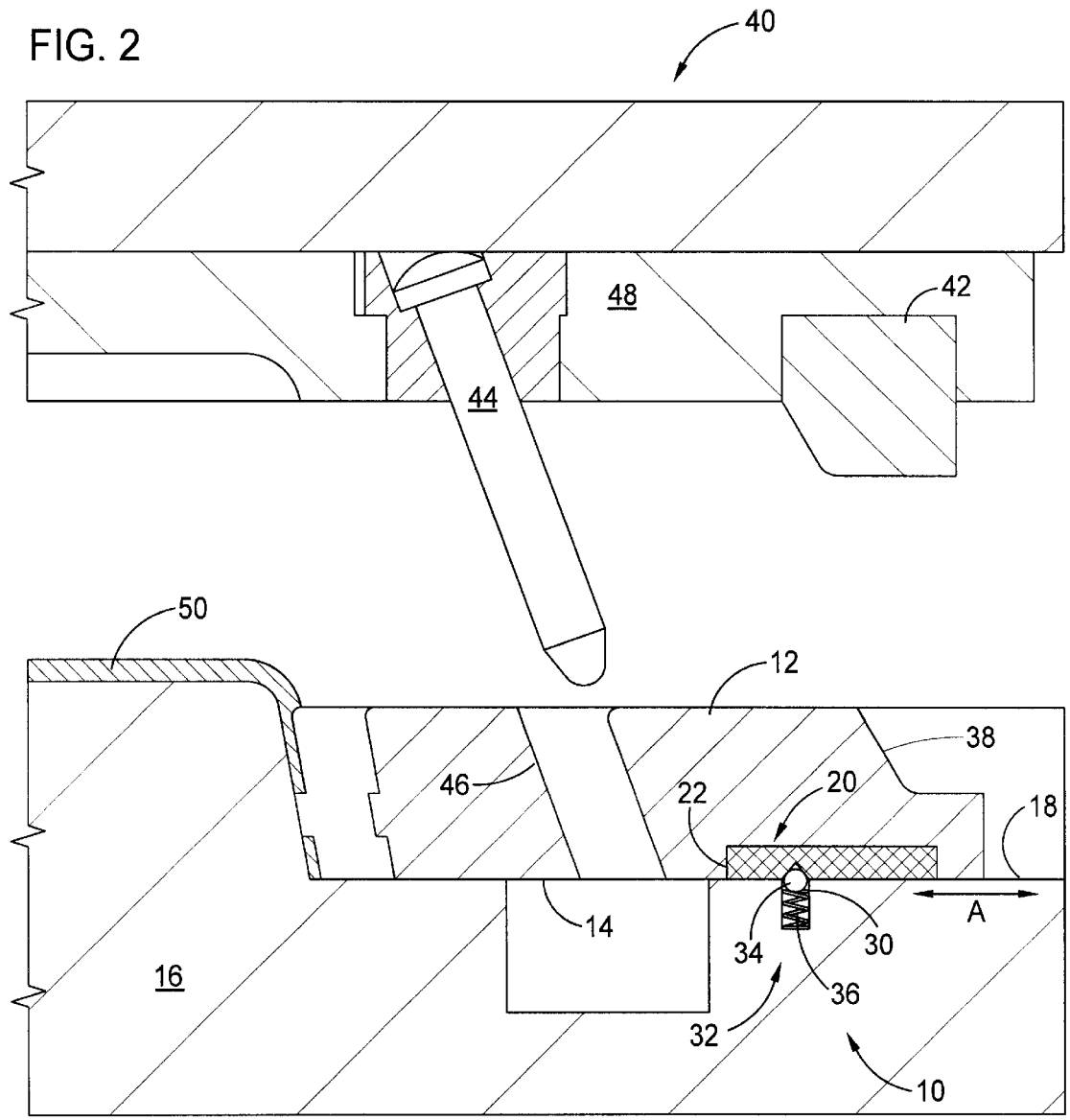

SLIDE RETAINER FOR AN INJECTION MOLD

BACKGROUND OF THE INVENTION

1. Field of the Invention

The present invention relates to injection molding apparatus and, more particularly, to a cam slide retainer used in an injection mold.

2. Description of the Related Art

Core members of various types and configurations are provided in mold constructions to form apertures, recesses, and the like, in molded parts. Typically, these core members extend fully or partially into a mold cavity to help define the final geometry of the finished part. In some mold constructions, the core members remain stationary with respect to the mold cavity throughout the molding cycle. Alternatively, a mold can include a core member that is movable with respect to the cavity to enable the formation of elements that are not compatible with the direction of mold separation.

In many mold assemblies, movable core members are attached to a cam slide that is moved by an angle pin. The angle pin is received in an angled bore extending through the core retaining plate and a corresponding angled opening in the cam slide. In the normal opening movement of the mold, the angle pin forces the slide laterally away from the molded piece on a guided path so the part can be removed from the mold cavity without interference from the core.

It is generally desirable to retain the cam slide in the retracted position while the mold is open to ensue that the angle pin will properly engage the mating hole in the slide when the mold close. One example of a slide retainer is described in U.S. Pat. No. 5,397,226. This patent shows a retainer assembly including an elongated rounded latch groove formed in the cam slide and a corresponding spring loaded plunger in the associated mold plate. The elongated groove in the cam slide is positioned to receive the plunger head and releasably lock the cam slide in position when the slide is moved to a retracted position away from the molded part.

While the plunger head of a slide retainer is typically hardened to minimize wear, the lower surface of the cam slide in contact with the plunger is made of a "softer" steel to facilitate machining. Since the cam slide traverses back and forth each time the mold opens and closes, the cam slide and retainer groove are subject to wear resulting from contact with the plunger during continuous operation of the mold. If the wear becomes extensive, the retainer may not engage properly, potentially resulting in damage when the mold closes.

Given the machining required to form a cam slide to the desired geometry for a particular core member, it is not generally desirable to make the entire slide from a material that is "hardened" to provide increased wear resistance. While it is known to provide a hardened insert containing the groove for the slide, other areas of the slide may still be subject to wear depending on the geometry of the slide and the distance the slide travels to reach the retracted position.

SUMMARY OF THE INVENTION

Accordingly, an object of the present invention is to provide an improved wear surface for a cam slide retainer used in injection molds that will remain in contact with the plunger throughout the stroke of the cam slide, thus minimizing the wear resulting from contact between the plunger and the slide.

The present invention accomplishes this objective by a slide retainer design incorporating a specially designed wear plate received in an appropriately positioned recess in the cam slide. The wear plate includes a latch groove and is made of a material having a greater hardness than the material from which the slide is made. To maximize durability, the wear plate is aligned in the direction of travel of the slide and has a length that is no less than the length of stroke of the slide. A conventional spring-loaded plunger mounted adjacent the wear plate remains in contact with the wear plate throughout the stroke of the slide and engages the latch detent when the slide moves to the end of its stroke, which corresponds to an open mold condition.

BRIEF DESCRIPTION OF THE DRAWINGS

FIG. 2 is a partial side elevation, sectional view showing the slide retainer wear plate in an open mold condition where the cam slide is moved to separate it from the molded part, and the plunger engages the latch groove in the wear plate to hold the cam slide at the end of its stroke.

DESCRIPTION OF THE PREFERRED EMBODIMENTS

Figure 1:
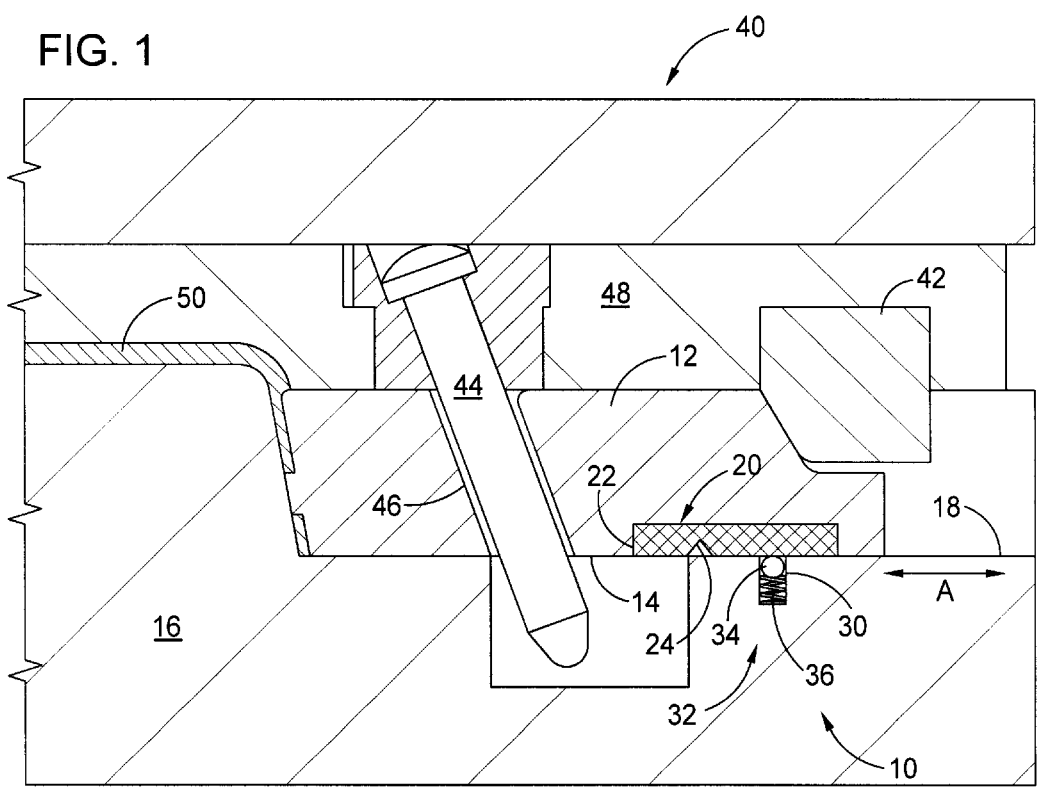
FIG. 1 is a partial side elevation, sectional view showing the slide retainer wear plate of the present invention in a closed mold condition where the cam slide is positioned to form a portion of the molded part.

Referring now to the drawings, FIG. 1 shows a slide retainer 10 according to the present invention in a conventional injection mold 40. The mold includes a cam slide 12 having a bottom surface 14 movable in a linear path along the top surface 18 of the core retaining plate 16, which may include a wear resistant surface plate (not shown), as is known in the art. The cam slide 12 includes a wear plate 20 received within a corresponding recess 22 in the cam slide 12.

Figure 3:
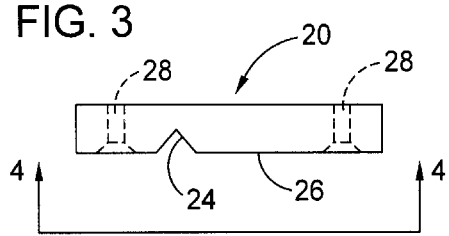
FIG. 3 is a side elevational view of the slide retainer wear plate of the present invention.
Figure 4:
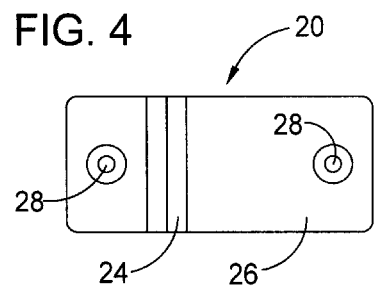
FIG. 4 is a bottom plan view of the slide retainer wear plate taken along line 4—4 of FIG. 3.

As best seen in FIGS. 3 and 4, the wear plate 20 is generally rectangular and has an elongated latch groove 24 formed in a the wear surface 26. The wear plate 20 is made from a standard grade of tool steel, such as H13, having a hard-ness number in the range of 40 to 45 Rc. Preferably, the groove 24 is V-shaped and machined into the wear plate 20 with a 45° base angle, spaning the full width of the wear plate 20. The groove 24 is disposed transverse to the linear path of movement of the cam slide 12 indicated by the directional arrow A. The wear plate 20 is retained in recess 22 of the slide 12 by conventional means, such as flat head screws through holes 28 in the wear plate 20.

The slide retainer 10 further includes a bore 30 provided in the mold core retaining plate 16, perpendicular to the top surface 18, to receive a spring loaded plunger 32 of conventional design. The plunger 32, as illustrated, includes a rounded plunger head 34 at least partially received in the bore 30. A coil spring 36 is fitted within the bore 30, below the plunger head 34 to bias the plunger head 34 against the wear plate 20 in the cam slide 12. With this construction, the rounded plunger head 34 will extend above the top surface 18 to engage the elongated latch groove 24 when the cam slide 12 is fully retracted, as seen in FIG. 2.

Referring again to FIGS. 1 and 2, the slide retainer 10 is used in a mold 40 that would typically include a heel block 42 secured to a cavity retaining plate 48. When the mold 40 assembly is closed, as in FIG. 1, the heel block 42 contacts the end portion 38 of the cam slide 12 to hold the slide 12 securely in position during the molding process. An angle pin 44 is received in an angled bore 46 in the cam slide 12. With this construction, the opening movement of the mold 40 will move the heel block 42 from the end portion 38 and simultaneously cause the pin 44 to contact the inner surface of the bore 46, moving the slide 12 along the top surface 18 of the core retaining plate 16, out of contact with the molded part 50. When the pin 44 exits the bore 46, the cam slide 12 will have traveled to is fully retracted position. In this position, the elongated latch groove 24 in the wear plate 20 will overlie the plunger 32. The force of the spring 36 will force the plunger head 34 into the groove 24, holding the slide 12 in its retracted position when the mold 40 is open, as shown in FIG. 2.

Although particular embodiments of the present invention have been illustrated and described, it will be apparent to those skilled in the art that various changes and modification can be made without departing from the concepts of the present invention. It is therefore intended to encompass within the appended claims all such changes and modifications that fall within the scope of the present invention.

What is claimed is:

1. A slide retainer for a mold having mating segments that are movable relative to each other and together form a mold cavity, and a linearly movable slide mounted in one of the mold segments that traverses a predetermined stroke to move a core element relative to the mold cavity, the slide retainer comprising:

(a) a wear plate including a latch detent and configured to be received in a corresponding recess in the slide wherein the length of the wear plate in the direction of travel of the slide is no less than the length of stroke of the slide, the wear plate being made of a material having a greater hardness number than the material from which the slide is made; and (b) a spring-loaded plunger mounted adjacent the wear plate, such that the plunger remains in contact with the wear plate throughout the stroke of the slide and engages the latch detent when the slide moves to the end of its stroke that corresponds to an open mold condition.

2. The slide retainer according to claim 1 wherein wear plate is made of tool steel.

3. The slide retainer according to claim 2 wherein wear plate is made of H13 tool steel having a hardness number in the range of 40 to 45 Rc.

4. The slide retainer according to claim 1 wherein the latch detent of the wear plate is in the form of a V-shaped groove.

5. The slide retainer according to claim 1 wherein the V-shaped groove has a 45° base angle and spans the full width of the wear plate.

* * * * *